J. A. HAGERSTROM.

TYPE WRITING MACHINE.

APPLICATION FILED JUNE 13, 1907.

Reissued Nov. 18, 1913. 13,649.

Witnesses:
L. Flynn
C. C. Smith

Inventor
John A. Hagerstrom
By his Attorneys
Young & Thomas

UNITED STATES PATENT OFFICE.

JOHN A. HAGERSTROM, OF NEW YORK, N. Y., ASSIGNOR, BY MESNE ASSIGNMENTS, TO VICTOR TYPEWRITER COMPANY.

TYPE-WRITING MACHINE.

13,649. Specification of Reissued Letters Patent. Reissued Nov. 18, 1913.

Original No. 810,202, dated January 16, 1906, Serial No. 249,370. Application for reissue filed June 13, 1907. Serial No. 378,880.

*To all whom it may concern:*

Be it known that I, JOHN A. HAGERSTROM, a citizen of the United States, and a resident of the city of New York, borough of Brooklyn, county of Kings, State of New York, have invented a new and useful Improvement in Type-Writing Machines, of which the following is a full, clear, and exact description.

The purpose of the invention is to provide a construction of type-levers or type-bars and a manner of mounting the same in bearings whereby each type-bar will have an extended bearing, insuring accuracy in printing action and stability in all positions, the bearings being so constructed that in spite of their extended bearings the type-bars can be arranged at no more than the usual distance apart, all striking at a common center.

A further purpose of the invention is so to mount the type-bars that their bearings can be quickly, conveniently, positively and independently adjusted to take up lost motion, and thereby adjust the type alinement.

The invention consists in the novel construction and combination of the several parts, as will be hereinafter fully set forth, and pointed out in the claims, reference being had to the accompanying drawings, forming a part of this specification, in which similar characters of reference indicate corresponding parts in all the figures.

Figure 1:
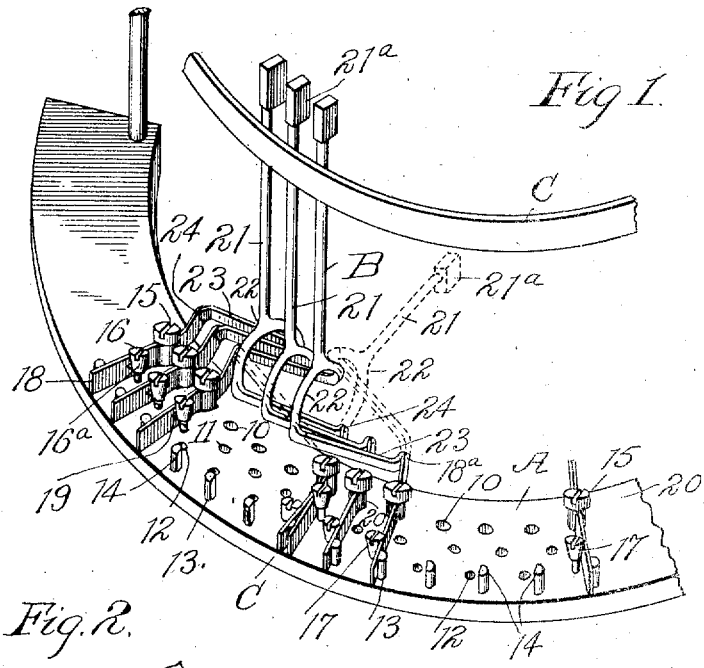
Figure 2:
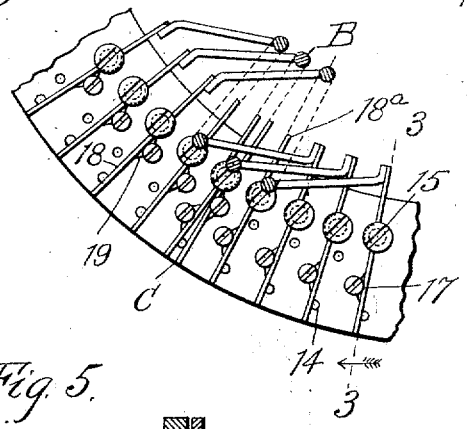
Figure 3:
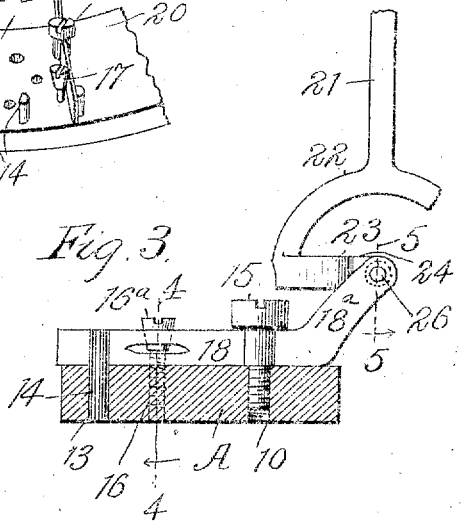
Figure 5:
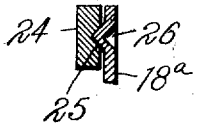
Figure 4:
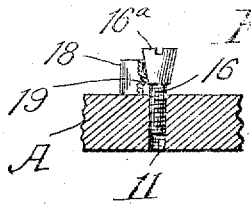

Figure 1 is a perspective view of a portion of the support for the type-bars and sundry of the type-bars and their bearings. Fig. 2 is a sectional plan view of the parts shown in Fig. 1, the section being taken horizontally through the lower portions of the type-bars. Fig. 3 is a vertical section taken practically on the line 3—3 of Fig. 2, the view being drawn upon an enlarged scale. Fig. 4 is a detail vertical section taken practically on the line 4—4 of Fig. 3, and Fig. 5 is a detail section taken substantially on the line 5—5 of Fig. 3.

A represents the supporting-plate for the type-bars B, and C the stop-rail against which the type-bars rest when in their vertical position or position of rest. The supporting-plate A is preferably provided with series of apertures 10, 11, 12 and 13, the first three named apertures being threaded and the aperture 13 plain, said latter aperture being adapted to receive pins 14. The apertures 10, 11 and 13 or 10, 12 and 13 pertaining to a single bearing support or hanger are shown arranged in substantially radial rows.

The threaded apertures 10 are adapted to receive shoulder screws 15, which extend a desired distance above the supporting-plate A, and the apertures 11 are adapted to receive screws 16, having tapering heads 16ª, at a desired distance above the said supporting-plate A, while the apertures 12 are adapted to receive similar screws 17. The screws 15 and pins 14 form abutments or bearing-posts and the screws 16 and 17 adjusting-screws. A bearing plate or hanger is provided for each bearing-post, having its inner end 18ª upwardly curved, so as to extend beyond the inner edge of the supporting-plate, as is shown in Figs. 1 and 2. Each hanger is provided with a projection 19 from one of its side faces, as shown in Fig. 2. Each hanger 18 is further provided with a curved or semicircular offset 20, the said offset being located between the projections 19 and the inner ends of the hanger. The hangers 18 are shown arranged substantially radial upon the supporting-plate A adjacent to the rows of apertures 10, 11 and 13 or 10, 12 and 13 and the semicircular depressions in the hangers formed by the offsets are each arranged to engage the head portion of a bearing-screw 15. The outer end portion of each hanger is made to engage with the corresponding side of a pin 14. An adjusting-screw 16 (or 17, as the case may be) is placed in an aperture 11 (or 12) so that its head will bear against the projection 19 of the hanger to which said adjusting-screw is assigned, as is shown in Figs. 1 and 2.

The type-bars B each consist of a body portion or shank 21, to one end of which the type 21ª is secured; and the opposite or fulcrum end of which is bifurcated to form diverging branches forming an arch or curve portion 22ª and foot members or extensions 23, which extend obliquely in opposite directions from the ends of branches 22—22, and the outer ends of the extensions are bent to form toe pieces 24. When the type-bars B are in position, their arch portions are at right angles to the supporting-plate A;

as is shown in Figs. 1 and 3, and are in horizontal alinement, and spaced a suitable distance apart, and their toe pieces 24 are pivoted to the appropriate hangers 18, the pivoting of the type-bars being such that the arch member of one type-bar will straddle or bridge over the extensions of a plurality of the other bars, as is shown in Figs. 1 and 2, the space within the arch forming a clearance for extensions of adjacent bars, and the axis of one bar overlapping the axes of neighboring bars. This results in a "nested" arrangement of the bars, the lateral extensions of one bar nesting within the extensions of adjacent bars, as will be seen in Figs. 1 and 2.

The type-bars are pivoted in the following manner: The toe-pieces 24 are provided with conical indentations 25, and inner ends 18[a] of the hangers 18 have conical projections 26, which enter the said indentations, as is shown in Fig. 5, so that should lost motion occur at the pivotal connection of any type-bar with its bearing a speedy and effective remedy is found by simply lowering one or other, or both, of the adjusting-screws 16 or 17 used in connection with that particular type-bar, thereby forcing the bearing end of the hanger 18 in direction of its mate, and thus tightening the connection between the hangers and the toe-pieces of the type-bar and causing the bar to maintain its correct position whereby alinement of the type is secured and maintained.

In the arrangement of the hangers shown two of them will necessarily come together at one point in the circular supporting-plate A, as is shown at C in Figs. 1 and 2, and at such position the offset portions 20 of both hangers 18 engage one post or screw 15, but at opposite sides thereof, and likewise engage with opposite sides of one pin 14, which is in radial line with said post or screw 15. But two adjusting-screws 16 and 17 are employed, each engaging with the outer faces respectively of the two hangers 18, one adjusting-screw being located in an aperture 11, and the other in an aperture 12. This arrangement will be repeated in the center portion of the supporting plate, as may be seen by following out the arrangement of the bars in Figs. 1 and 2. From these figures it will be seen, by tracing out the pair of hangers 18 belonging to any one bar, that five hangers or five screws 15 and pins 14, intervene the pair of hangers belonging to any one bar; or, in other words, one bar bridges five of the hangers of other bars. Thus, in Fig. 1, the hanger shown at the extreme right has for its mate the right hand hanger shown at C. For the next bar to the right a second hanger will be placed in position on the right hand side of top screw 15 and pin 14 next to C on the right; and this arrangement of two hangers, one on each side of a screw 15 and pin 14, will be repeated as far as necessary to accommodate the number of bars required. It will be understood, and is apparent from the drawing, that for those hangers on the right of pins 14 and screws 15, the taper head screws 16 in holes 11 are appropriate, and for those hangers which lie against the left of said screws 15 and pins 14, the taper screws 17 in holes 12 are required. The screw 15 and pins 14, as also screws 16 and 17, form supports or abutments for the hangers 18, each of which is held by a screw 15 and pin 14 on one side thereof and an adjusting screw 16 (or 17) on the other side. The adjusting screw 16 (or 17) being intermediate screw 15 and pin 14, and in rear of screw 15, lateral pressure exerted by the taper head of the adjusting screw on the hanger or plate 18 tends to shift the bearing—or inner end of the hanger 18 in the opposite direction. Screws 15 are screwed down on the upper edges of the hangers 18, which are thus rigidly and securely held between the heads of the screws and the supporting-plate A. By this construction and arrangement the hanger arms are securely and adjustably held against longitudinal or lateral movement.

With the above-described construction and arrangement of type-bars and bearings, it will be seen that a wide or extended bearing is provided for each type-bar, thereby rendering said bars more accurate and steady in their action and giving them great lateral rigidity, thus preserving accurate printing alinement of the type. At the same time, by the form and arrangement of the type-bars, no additional space is occupied or required for mounting them, but a full set may be accommodated within the space available either in machines known as "visible writing" machines or in the "type basket" machines. Each bar has free and independent movement without interference with its neighbors and the bearings may be independently adjusted; also any bar may be removed and a new one inserted without disturbing any of the others.

It will be apparent from the foregoing description and drawing that the bars being mounted on the supporting plate A which forms a circle or arc of a circle about the printing center, the pivotal points of a bar will be upon the circumference of a circle, and a line joining a pair of pivotal points will form the chord of a circle whose center is the printing center of the machine.

From the foregoing description of the bar and by reference to the drawings it will be observed that the arms of the bar first extend away from each other in the plane of movement or rotation of the bar, and then extend toward the pivotal axis or axial plane and away from the plane of rotation or movement; and if the bars be considered as lying horizontally in their normal position it will be seen that one of the arms extends away from the top and the other away from the bottom of the body or shank of the bar, and that each arm also extends laterally away from the sides of the bar, one of said arms extending in one direction and the other in the other direction; and that the upper arm is inclined downwardly and laterally in one direction to its pivotal point, while the lower arm is inclined upwardly and laterally in the other direction to its pivotal point, both upper and lower arms being in nested arrangement. It will be noted upon reference to Fig. 2 that the bars are Z-shaped at their pivot ends. It will also be seen that the arms of the bars form what might be regarded as eyes or loops and that the bearing arms of adjacent bars pass through the eye or loop of a given bar. From the described and illustrated construction of the bars and their hangers it will clearly be seen that the branches or arms of one bar bridge branches of adjacent bars and are also so constructed as to form a clearance for the arms of adjacent bars, thus permitting the operation of any bar without interference or collision with another, the arched or curved portion being in a plane which is radial to the printing point and substantially at right angles to the axis of movement of the bar.

Various forms and modifications of the construction shown in the drawings may of course be made without departing from the essence of the invention.

The characteristic features of the invention are a bar of such construction and formation that it has exceptionally wide bearings, of a width greater than the dividend of the whole segment divided by the total number of bars, and so mounting bars of such construction that they form a single series and in which the pivots are arranged in a common line or curve. The bars being further of such construction that while their arms overlap in the series, yet each bar clears the other and swings unimpeded by the others to printing position.

I claim:

1. In a typewriting machine, the combination of a plurality of type-bars, said bars having lateral bearing extensions, a pair of independent hanger-arms for each bar, bearing connections between said hanger-arms and extensions, the members of a pair of hanger-arms having intervening between them members of other pairs of hanger-arms, and the axes of rotation of said bars forming chords of circle whose center is the striking point of the machine.

2. In a typewriting machine, the combination of a plurality of type-bars, said bars having lateral bearing extensions, a pair of independent hanger-arms for each bar, bearing connections between said hanger-arms and extensions, means to adjust said hanger-arms, the members of a pair of hanger-arms having intervening between them members of other pairs of hanger-arms, and the axes of rotation of said bars forming chords of circle whose center is the striking point of the machine.

3. In a typewriting machine, the combination of a plurality of type-bars, said bars having an arched fulcrum end the arch portion whereof is substantially radial to the printing center of the machine, bearing extensions springing laterally from the limbs of the arch portion, a pair of independently-mounted hanger arms for each type-bar, bearing connections between said hanger-arms and extensions, and the members of each pair of hanger-arms having intervening between them members of other pairs of hanger-arms.

4. In a typewriting machine, the combination of a plurality of type-bars, said bars having an arched fulcrum end the arch portion whereof is substantially radial to the printing center of the machine, bearing extensions springing laterally from the limbs of the arch portion, a pair of independently-mounted hanger-arms for each type-bar and bearing connections between said hanger-arms and extensions, said bars mounted in nested arrangement with the bearing extensions of one bar intersecting the planes of rotation of one or more adjacent bars.

5. In a typewriting machine, the combination of a plurality of type-bars, each bar formed at its fulcrum end with an arched portion, said arched portion being transverse to the axis of rotation of the bar, a lateral bearing extension springing from each limb of the arched portion, a pair of independently mounted hanger-arms for each bar, the members of the pair having bearing connections with the lateral extensions of a bar, and said bars mounted with their lateral extensions in nested arrangement one with another.

6. In a typewriting machine, the combination of a plurality of type-bars, each bar formed at its fulcrum end with an arched portion, said arched portion being transverse to the axis of rotation of the bar, a lateral bearing extension extending from the ends of the arched portion obliquely to the plane of rotation of the bar, a pair of separately mounted hanger-arms for each bar, and bearing connections between said hanger-arms and the free ends of said extensions.

7. In a typewriting machine, the combination of a plurality of type-bars, each bar having a pair of bearing extensions extending in each direction laterally from the plane of rotation of the bar, an arched portion connecting the said extensions to the shank or body of the bar, a pair of separately mounted hanger-arms for each bar and bearing connections between said hanger-arms and said extensions.

8. In a typewriting machine, the combination of a plurality of type-bars, each bar having a pair of bearing extensions extending in each direction laterally from the plane of rotation of the bar, an arched portion connecting the said extensions to the shank or body of the bar, said arched portion transverse to the axis of rotation of the bar, a pair of separately mounted hanger-arms for each bar and bearing connections between said hanger-arms and said extensions.

9. In a typewriting machine, the combination of a plurality of type-bars, each bar having a pair of bearing extensions extending in each direction laterally from the plane of rotation of the bar, an arched portion connecting the said extensions to the shank or body of the bar, the lateral extensions of one bar extending beyond the arched portions of adjacent bars, a pair of separately mounted hanger-arms for each bar and bearing connections between said hanger-arms and said extensions.

10. In a typewriting machine, the combination of a plurality of type-bars, each bar having a pair of bearing extensions extending in each direction laterally from the plane of rotation of the bar, a branch or member uniting said bearing extensions to the shank or body of the bar, said branch extending away from the axis of the bar and in the direction of its plane of rotation, a pair of separately mounted hanger-arms for each bar and bearing connections between said hanger-arms and said extensions.

11. In a typewriting machine, the combination of a plurality of type-bars, each bar formed with a shank carrying the type at one end thereof, divergent branches springing from said shank at a point short of the axis of rotation of the bar, said branches extending in a direction transverse to said axis, bearing extensions extending from said branches laterally on each side of the plane of rotation of the bar, and a pair of separately mounted hanger-arms, said hanger-arms having bearing connections with the bearing extensions.

12. In a typewriting machine, the combination of a plurality of separately mounted hanger-arms, said hanger-arms arranged in pairs with adjacent hanger-arms pertaining to different pairs, a plurality of type-bars, each type-bar having lateral bearing extensions connecting it with its pair of hanger-arms and an arched member connecting said bearing extensions with the shank of the bar, said arched portion forming a clearance for the lateral extensions of adjacent bars.

13. In a typewriting machine, the combination of a plurality of adjacently mounted type-bars, a pair of separately mounted hanger-arms for each bar, the members of each pair non-adjacently mounted, lateral bearing extensions for each bar connecting the same with its pair of hanger-arms, an arched offset connecting said extensions to the shank of the bar, said arched offset forming a clearance for lateral extensions of adjacent bars to one side of a given bar, and the lateral extensions to that side of said given bar moving in the clearance formed by the arch members of said adjacent bars.

14. In a typewriting machine, the combination of a supporting plate, hanger-arms for type-bars mounted on said plate, abutments on said plate for each hanger-arm, means for exerting lateral pressure on said hanger-arms, whereby said hanger-arms are secured in position and held between said pressure means and the abutments.

15. In a typewriting machine, the combination of a hanger support, lateral abutments radially arranged on said support, a plurality of hanger-arms mounted upon said support against said abutments, securing screws for said hangers, said screws lying in arcs of concentric circles and means for holding said hanger arms against said abutments, lateral movement of each of said hanger arms being prevented by the sides of its abutments.

16. In a typewriting machine, the combination of a supporting plate for the hanger arms, abutments arranged in pairs on said supporting plate, hanger arms on said plate, and each supported laterally by a pair of said abutments, and means to hold the hanger arms against the abutments.

17. In a typewriting machine, the combination of a supporting plate for the hanger arms, abutments projecting from said plate for laterally supporting the hanger arms, one part of the abutment of each hanger arm being formed by a headed screw, hanger arms mounted on said plate against said abutments, and held between said screw heads and the plate, and adjustable means for holding said arms laterally against the abutments.

18. In a typewriting machine, the combination of a supporting plate, hanger-arms mounted on said plate, type-bar bearings in one end of said arms, a pair of abutments for each hanger-arm, the bearing ends of said arms extending beyond the abutments, and means for exerting variable lateral pressure on said hanger-arms at a point intermediate the abutments whereby said arms are secured in position against said abutments and the type-bar bearings adjusted.

19. In a typewriting machine, the combination of a supporting plate, pairs of posts projecting from said plate, each pair in substantially radial line with the printing center of the machine, hanger-arms mounted on said plate and supported laterally against said pairs of posts, and adjustable pressure devices at the sides of said hanger-arms opposite to the posts, whereby said hanger-arms are held between said posts and pressure devices.

20. In a typewriting machine, the combination of a supporting plate, pairs of posts projecting from said plate, each pair in substantially radial line with the printing center of the machine, hanger-arms mounted on said plate and supported laterally against said pairs of posts, certain of said pairs of posts common to two hanger-arms, and adjustable pressure devices at the sides of said hanger-arms opposite to the posts, whereby said hanger-arms are held between said posts and pressure devices.

21. In a typewriting machine, the combination of a supporting plate, two series of posts rising from said plate, both series concentrically arranged with regard to the printing center of the machine, each of said posts of one series in radial alinement with a post of the other series, hanger-arms mounted on said supporting plate, each hanger-arm bearing against the posts of each series which are in radial alinement, and a series of adjustable pressure devices for exerting lateral pressure on said hanger-arms to hold the same against their posts.

22. In a typewriting machine, the combination of a supporting plate, two series of posts rising from said plate, the posts of one series in radial alinement with the posts of the other series, the posts of one series formed by shoulder screws, hanger-arms mounted on said plate, each hanger-arm lying against a pair of said radially alined posts, each hanger-arm having a curved offset to engage the screws beneath their shoulders, and a series of adjusting screws in said supporting plate, each adjusting screw arranged intermediate the two posts in radial alinement, and on the side of the hanger-arm opposite to said radially alined posts, whereby each hanger-arm is held between the posts of one side thereof and the adjusting screw on the other side thereof and between the supporting plate and the shoulder of said screw post.

23. In a typewriting machine, the combination of a supporting plate, pairs of posts projecting from said plate, each pair in substantially radial alinement with the printing center of the machine, the forward post of each pair formed by a shoulder screw, hanger-arms mounted on said plate, each hanger-arm bearing against a pair of posts and engaging beneath the shoulder of the said screw, a variable pressure device engaging each hanger-arm on the side thereof opposite said posts whereby each hanger-arm is secured laterally by said posts and pressure device, and is held against the plate by the shoulder.

24. In a typewriting machine, the combination of a supporting plate, pairs of posts in substantially radial alinement with the printing center of the machine projecting from said plate, the forward posts of said pairs formed of shoulder screws tapped in said plate, taper headed screws tapped in said plate at points intermediate the members of said pairs of posts, hanger-arms mounted on said plate, each hanger-arm arranged between a pair of posts on one side thereof and a taper headed screw on the other side thereof, whereby said hanger-arms are held laterally by said posts and screws and against said plate by the shoulder screws.

25. In a typewriting machine, the combination of a supporting plate, pairs of posts radially alined with the printing center of the machine projecting from said plate, hanger-arms mounted upon said plate and bearing laterally against said pairs of posts, the bearing ends of said hanger-arms projecting beyond its adjacent post, adjusting screws having inclined surfaces tapped in said plate at points intermediate the members of each pair of posts, said screws engaging said hanger-arms with their inclined surfaces and holding the same against their pairs of posts, whereby adjustment of said screws shifts laterally the bearing ends of said arms and adjusts the type-bar bearings.

26. In a typewriting machine, the combination of a supporting plate, a series of shoulder screws tapped in said plate, said series concentrically arranged with the printing center of the machine, a corresponding series of pins similarly arranged in said plate with each pin in substantially radial alinement with one of said screws, hanger-arms mounted on said plate and bearing laterally each against one of said screws and its corresponding pin with the bearing ends of said hanger-arms extending beyond said screws, the screws and pins in the central portion of said plate common to two hanger-arms, one on each side thereof, an adjusting screw for each hanger-arm bearing adjustably against the same in opposition to its screw and pin, said screws situated intermediate the screw and pin pertaining to its hanger-arm whereby the bearing end of the hanger-arm is adjusted by adjusting the pressure of said screw.

27. In a typewriting machine, the combination of a hanger support, a hanger comprising two arms, screws securing said arms in place, a pivotal bearing projection on each hanger-arm, a type-bar having an arched offset transverse to its axis of movement, and lateral bearing extensions provided with seats which engage said bearing projections.

28. In a typewriting machine, the combination of a hanger support, a hanger comprising two arms mounted on said support, an integral bearing projection on each arm, and a type-bar having lateral bearing extensions, seats in said extensions engaging the said bearing projections of the hangers, and an arched offset transverse of the axis of movement of the bar connecting said bearing extensions to the shank of the bar.

29. In a typewriting machine, the combination of a hanger support, a hanger comprising two independent hanger-arms, screws securing said hanger-arms in place, said hanger-arms separately removable and separately adjustable, a pivotal bearing on each hanger-arm and a type-bar having an arched offset transverse of its axis of movement and lateral bearing extensions, said extensions having indentations coöperating with said pivotal bearings on the hanger-arms.

30. A type-bar for typewriting machines, having a shank adapted to carry the type at one end, and having its other end formed in two branches, said branches laterally separated and deflected in opposite directions from the line of the shank, the extremities of said extensions deflected toward each other and intersected by the axis of rotation of the bar, said branches adapted to embrace branches of adjacent type-bars and to provide a clearance therefor.

31. A type-bar having a body portion, said body portion branched at one end into two branches, said branches extending laterally of the direction of stroke of said bar, and having pivotal bearings in their ends, and said branches having the portions adjacent the body of the bar deflected to lie substantially in the line of stroke of the bar, and to form a clearance for the lateral branches of neighboring bars.

32. In a typewriting machine, a pair of independent hangers, independent supports and lateral adjusting devices for each hanger, a type bar having an arched lower extremity, and foot members extending in opposite directions from, and at an angle to the terminals of said arched extremity, each foot member having an independent pivotal connection with one of said hangers.

33. In a typewriting machine, a pair of hangers, supports and lateral adjusting devices for the same, and a type bar having a lower arched member and foot members extending horizontally in opposite directions from the ends of the arched member, which foot members are pivoted in said hangers.

34. In a typewriting machine, a support, bearing plates in pairs, located on said support, lateral adjusting devices for the bearing plates, a type bar having an arched lower member, radially disposed with reference to the support, horizontal oppositely disposed foot members extending from the arched member, toe extensions from the foot members and pivotal connections between the bearings plates and the toe extension of the type bar.

35. In a typewriting machine, a supporting plate, bearing posts carried by the supporting plate and arranged in transverse rows, bearing plates in pairs, located upon the supporting plate, said bearing plates having semi-circular offsets for engagement with one of said bearing posts, their upper ends being upwardly curved beyond the inner edge of the supporting plates, the outer ends of said bearing plates having engagement with the other of said bearing posts, said bearing plates being also provided with projections from one side face and with conical offsets at their curved inner ends, and type bars having arched lower members radially disposed to the supporting plate and oppositely extending foot members at the ends of the arched members, each foot member having a toe extension provided with a depression to receive the offsets from the inner ends of the bearing plates, and adjusting screws engaging with the projections of the bearing plates, as described.

JOHN A. HAGERSTROM.

Witnesses:

ANNA L. CAMPBELL,

L. H. PERRY.